Patented Feb. 6, 1951

2,540,153

UNITED STATES PATENT OFFICE 2,540,153

POLYMERIC COMPOSITIONS FROM VINYL TERTIARY HYDROXY KETONES AND PROCESS FOR PREPARATION THEREOF

Richard S. Wilder, Roslyn, Pa., and Daniel F. Herman, Newark, N. J., assignors to Publicker Industries Inc., Philadelphia, Pa., a corporation of Pennsylvania No Drawing. Application July 8, 1947, Serial No. 759,725

24 Claims. (Cl. 260—63)

Our invention relates to new polymeric compositions, and more particularly, it is concerned with polymers and copolymers of novel vinyl t-hydroxy ketones in which the keto and t-hydroxyl groups are one and two carbon atoms removed, respectively, from the vinyl group. Specifically, such ketones may be generally represented by the following formula:

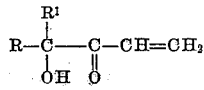

in which the substituents R and $R^1$ may be either aralkyl, alkyl or aryl, and R and $R^1$ combined may constitute a part of a cycloaliphatic ring.

These vinyl t-hydroxy ketones may be polymerized alone or in combination with one or more polymerizable open chain compounds containing at least one —CH=C= group. This polymerization, in general, can be effected in the presence or absence of a solvent for the reactant or reactants, and preferably in the presence of a suitable polymerization catalyst, at a temperature which in general, may vary from between about —80° C. to 100° C., or higher. Superatmospheric pressure may be employed if considered expedient. In general, we have observed that polymerizations of the type involved in the present invention occur relatively rapidly, i. e., the majority of such reactions effected by us have been substantially completed within a period of approximately one-half hour. The polymer thus obtained is usually a soft to hard, clear to cloudy, rubber-like product. Where a solvent is employed the latter can be evaporated to give, in general, a hard product that can be crushed, powdered, and molded, or otherwise suitably shaped.

In preparing the copolymers of our invention the proportions of the reactants may vary widely. Compositions containing a substantial portion of vinyl t-hydroxy ketone, i. e., 50% or more, are generally found to be readily soluble in the common oxygenated organic solvents as well as in the usual hydrocarbon solvents and are ordinarily soft, tacky to elastic polymers. The compositions prepared by employing less than 50% vinyl t-hydroxy ketone are usually found to be substantially insoluble in the common oxygenated organic solvents, but are ordinarily soluble in solvents such as, chlorinated hydrocarbons, as well as the common hydrocarbon solvents, and are usually harder and less elastic than the compositions containing higher concentrations of vinyl t-hydroxy ketone. Conditions of time, temperature, pressure, and quantity of catalysts utilized also have a direct effect on the nature of the final product. Generally, it has been observed that an increase in any of the foregoing reaction conditions results in the procurement of a product in which polymerization has proceeded to a greater extent. Such conditions obtain in the case of the homo-polymers of our invention as well as with the copolymers mentioned above.

As example of suitable vinyl t-hydroxy ketones that may be employed in carrying out our invention, there be mentioned 2-methyl-4-penten-2-ol-3-one, 4-methyl-1-hexen-4-ol-3-one, 4,6-dimethyl-1-hepten-4-ol-3-one, 4-ethyl-1-hexen-4-ol-3-one, vinyl α-hydroxycyclohexyl ketone, 2-phenyl-4-penten-2-ol-3-one vinyl α-hydroxycamphoryl ketone, vinyl α-hydroxycyclopentyl ketone, 2-(β-phenylethyl)-4-penten-2-ol-3-one, and the like. These vinyl t-hydroxy ketones are readily prepared by the procedure described and claimed in our copending application, U. S. Serial No. 740,728, filed April 10, 1947. In accordance with the procedure there described the vinyl t-hydroxy ketones are produced by first preparing the corresponding N-disubstituted amino t-hydroxy ketones. This synthesis involves condensing a suitable t-hydroxy ketone with formaldehyde and a secondary amine salt as described in detail in our copending application, U. S. Serial No. 740,727, filed April 10, 1947. The N-disubstituted amino t-hydroxy ketone thus prepared is then converted to the corresponding vinyl t-hydroxy ketone by subjecting to pyrolysis the reaction mixture containing the N-disubstituted amino t-hydroxy ketone. The vinyl t-hydroxy ketone thus produced is then preferably removed from the reaction mixture as it is formed by means of distillation.

The polymerizable compounds which may be copolymerized with the vinyl t-hydroxy ketones in preparing the polymeric compositions of the present invention, comprise an extremely large group of substances, and may be selected from a class of open chain compounds having at least one —CH=C= group in the molecule. Examples of polymerizable compounds containing at least one —CH=C= group and which may be employed in the synthesis of the compositions of our invention, are compounds possessing one of the following groups and no others: —CH=CH—, $CH_2$=CH—, and $CH_2$=C=, wherein each of the free valence bonds in the latter formula is satisfied by a separate substituent other than hydrogen. Specific compounds falling within the above mentioned broad class and which possess the —CH=CH— grouping are cinnamic acid, stilbene, β-chlorovinyl acetate, dicrotyl ether, allyl crotyl ether, vinyl crotyl ether, vinyl anol ether, dicrotyl maleate, and the like. Compounds specifically covered by the grouping $CH_2=CH—$ and which may be utilized in preparing our new copolymers are trivinyl meseate, diallyl maleate, trivinyl citrate, butadiene, styrene, vinyl butyl ether, divinyl -o-phenylene diacetate, divinyl phenyl butyrate o-carboxylate, dichloro styrene, methyl acrylate, vinyl allyl ether, allyl crotyl ether, ethylene glycol divinyl ether, diethylene glycol diallyl ether, divinyl methyl glyceryl ether, divinyl glyceryl ether, acrylonitrile, vinyl acetate, tetravinyl pentaerythrityl ether, hydroquinone divinyl ether, phenyl (1,4-diethyl) divinyl ether, o-vinyl phenyl ether, vinyl chloride, vinyl chavicol ether, allyl ether of coniferyl allyl ether, vinyl-o-toluate, vinyl phenyl acetate, and the like. As examples of the compounds specifically covered by the grouping $CH_2=C=$ wherein each of the two free valences is satisfied by a separate substituent other than hydrogen, there may be mentioned di-β-chlorallyl ether, vinyl methallyl ether, trimethallyl glyceryl ether, methallyl allyl ether, γ-phenyl α-methyl allyl methallyl ether, methallyl-α-phenyl allyl ether di β-methallyl maleate, vinylidine chloride, 2-methyl-3-chloro-1,3-butadiene, 2-chloro-1,3-butadiene, methyl isopropenyl ketone, α-chloro-α-phenyl ethylene, and the like.

The catalysts employed in effecting our invention may likewise vary widely, both with respect to the particular type of catalyst and the concentration thereof that may be utilized. Catalyst concentrations of between about 0.1% to 5% or more, based upon the weight of polymerizable material present, may be employed. However, in the majority of instances we have found it desirable to utilize catalyst concentrations of from about 0.1% to about 1%. As examples of suitable catalysts there may be mentioned hydrogen peroxide, benzoyl peroxide, ascaridole peroxide, boron trifluoride, aluminum chloride, zinc chloride and the like.

In connection with the foregoing, the expression "polymerizable open chain compound" appearing in the present description and claims, said expression is intended to cover, in addition to the ordinary aliphatic polymerizable compounds containing such an unsaturated structure, compounds such as divinyl benzene, styrene, vinyl pyridine, and divinyl naphthalene, as well as various other compounds such as those specifically enumerated above.

Owing to the wide range of reactants covered by our invention, it will be found that certain solvents suitable for use in preparing various of our new compositions cannot be universally employed. However, it may generally be said that water and the lower aliphatic alcohols constitute suitable solvents for effecting homopolymerization of the vinyl t-hydroxy ketones and that the alcohols, chlorinated hydrocarbons and the common hydrocarbon solvents may be used in effecting conjoint or copolymerization of mixtures containing a vinyl t-hydroxy ketone with one or more additional polymerizable substances.

The new polymers of our invention are useful in the preparation of pressure sensitive adhesives, bonding agents, synthetic fibres and valuable film forming compositions such as synthetic shellacs, and the like.

Our invention may be further illustrated by the following specific examples:

EXAMPLE 1

A sample of 2-methyl-4-penten-2-ol-3-one is heated on a steam bath in the presence of 0.1% of benzoyl peroxide. Within three minutes a very rapid polymerization occurs to yield a clear, water-white, tacky, elastic polymer soluble in ethyl alcohol and toluene.

EXAMPLE 2

A sample of 4,6-dimethyl-1-hepten-4-ol-3-one is heated on a steam bath in the presence of 0.1% of benzoyl peroxide. The compound polymerizes slowly to give after six hours a viscous, sticky polymer.

EXAMPLE 3

A 50% solution of 2-methyl-4-penten-2-ol-3-one in water is heated on a steam bath for fifteen minutes in the presence of 0.25% benzoyl peroxide. As the polymer is formed it is observed to precipitate from solution in the form of a tacky, white, water-insoluble product.

EXAMPLE 4

A mixture of 250 parts of 2-methyl-4-penten-2-ol-3-one, 250 parts of styrene and 50 parts of vinyl butyl ether in 1,500 parts of 95% ethanol is heated under reflux for four hours in the presence of 5 parts of benzoyl peroxide. A clear water-white solution of copolymer is obtained with a solids content slightly lower than that of a three pound cut of shellac.

The water resistance of the films formed on application of the aforesaid solution by brushing or spraying is improved by the addition of hydrogenated rosin, usually in a concentration of about 2% based on the weight of the copolymer present. Water resistance may also be improved by the addition of 2% to 3%, or more, of a suitable wax such as for example, candelilla, ceresin, paraffin, and the like. If desired, a small quantity, for example, about 5% of xylene, or the equivalent thereof, may be added to lengthen the drying time of the film formed, based on the amount of solvent employed. Solutions of the above general type constitute highly satisfactory coating compositions having excellent brushing qualities. If desired, other solvents such as the other lower aliphatic alcohols for example isopropanol, butanol, etc. ethyl acetate, butyl acetate, and the like, or other diluents or diluent mixtures such as petroleum naphtha and hydrogenated petroleum diluents, and other natural or synthetic resins, and plasticizers may be incorporated in the film forming compositions of our invention. In adding such materials, however, care should ordinarily be observed not to incorporate substantial amounts of materials tending to appreciably increase the viscosity or in any way disturb the solvent balance of such compositions. It is to be pointed out that in preparing these coating compositions the film forming agent (polymer) should, in general, be composed of at least about 45% to 50% of vinyl t-hydroxy ketone. Polymers in which the vinyl t-hydroxy ketone is present in substantially less amounts, generally result in a product that is rather difficult to dissolve.

EXAMPLE 5

A sample of 2-phenyl-4-penten-2-ol-3-one is heated on a steam bath for a period of two hours in the presence of 0.1% hydrogen peroxide. The polymer thus formed, is a white, tacky, water-insoluble composition.

EXAMPLE 6

A solution of 5 parts of 2-methyl-4-penten-2-ol-3-one in 25 parts of 2.5% soap solution containing 0.5% of a dispersing agent of the naphthalene formaldehyde sulphonate type, and 0.2% of benzoyl peroxide is heated on a steam bath with agitation to give within thirty minutes an emulsion of the polymer produced. The emulsion is broken by the addition of a concentrated solution of sodium chloride to coagulate the polymer which is a soft, white, water-insoluble solid.

EXAMPLE 7

A mixture of 20 parts of 2-methyl-4-penten-2-ol-3-one in 25 parts of ethanol is heated on a steam bath in the presence of 0.2 part of benzoyl peroxide to give in three hours a viscous solution of the polymer. The product is percipitated by pouring the solution thereof into 200 parts of water. A lustrous, white, rubber-like mass is obtained which resists sudden stresses in an elastic manner, thus indicating a linear polymer which can be oriented on stretching. This polymeric composition can be stretched into thin membrane-like sheets. On drying for a period of three hours at 110° C. and then cooling, the polymer gives a glass-like brittle product.

EXAMPLE 8

A mixture of 10 parts of 2-methyl-4-penten-2-ol-3-one and 10 parts of 2-methyl-3-chloro-1,3-butadiene is warmed on a steam bath in the presence of 0.2 part of benzoyl peroxide to give in approximately ten minutes a rubbery, tough, tacky polymer. This polymer exhibits the peculiar property of sticking tenaciously to a surface on application of pressure and coming away cleanly from the surface on being withdrawn slowly, i. e., it is tacky but exhibits more cohesion than adhesion. It can also be stretched into thin, tough, elastic membrane-like films.

EXAMPLE 9

A mixture of 20 parts of 2-methyl-3-chloro-1,3-butadiene and 20 parts of 2-methyl-4-penten-2-ol-3-one in 70 parts of water containing about 3% of an alkylated aryl sulfonate type wetting agent and 0.5% of a naphthalene formaldehyde sulfonate type dispersing agent, is polymerized in the presence of 1 part of 30% hydrogen peroxide. The reaction mixture is vigorously stirred for a period of about one hour on a steam bath. A stable emulsion of the copolymer is formed which is broken by the addition of dilute acid. If the pH drops during the course of the polymerization, the polymer precipitates as it is formed. Such precipitation may be prevented by the addition of a suitable buffer. The polymer thus obtained is a tough, elastic and rubbery composition, but is not as tacky as the product obtained in Example 8.

The effect of varying the relative proportions of 2-methyl-3-chloro-1,3-butadiene and 2-methyl-4-penten-2-ol-3-one on the polymeric product obtained is given in the table appearing below. The conditions employed in preparing these polymers are identical with those used in Example 8.

Table

| Per Cent 2-Methyl-3-chloro-1,3-butadiene | Per Cent 2-Methyl-4-penten-2-ol-3-one | Properties of Polymer |
|---|---|---|
| 12.5 | 87.5 | Soft, tacky, elastic, little "body", soluble in ethanol, toluene and chloroform. |
| 25 | 75 | Soft, elastic, good "body" capable of being stretched into very thin sheets and filaments, soluble in ethanol, toluene and chloroform. |
| 50 | 50 | Tough, elastic, non-tacky, insoluble in ethanol, toluene and chloroform. |
| 75 | 25 | Tough, rubbery, non-tacky, insoluble in ethanol, toluene and chloroform. |
| 87.5 | 12.5 | Hard, rubbery, tough, non-tacky insoluble in ethanol, toluene and chloroform. |

Relatively low molecular weight copolymers of 2-methyl-4-penten-2-ol-3-one with 2-methyl-3-chloro-1,3-butadiene are obtained by copolymerizing these materials in toluene solutions in accordance with the procedure shown in the example which follows:

EXAMPLE 10

A solution of 30 parts of 2-methyl-4-penten-2-ol-3-one and 10 parts of 2-methyl-3-chloro-1,3-butadiene in 120 parts of toluene and containing 0.2 part of benzoyl peroxide is heated on a steam bath for a period of three hours to give a solution of the polymer. On evaporation of the toluene, a soft, very tacky, plastic mass is obtained which can be drawn into long extremely fine filaments without breaking. Copolymers consisting of 50% 2-methyl-3-chloro-1,3-butadiene–50% 2-methyl-4-penten-2-ol-3-one and 25% 2-methyl-3-chloro-1,3-butadiene–75% 2-methyl-4-penten-2-ol-3-one are found to have similar properties.

EXAMPLE 11

A solution containing 20 parts of 2-methyl-3-chloro-1,3-butadiene, 20 parts of 2-phenyl-4-penten-2-ol-3-one in 120 parts of toluene, and 0.2 part of benzoyl peroxide is heated on a steam bath for approximately three hours to give a solution of the polymer. On evaporation of the toluene a tacky, plastic mass is obtained, capable of being drawn into thin sheets.

EXAMPLE 12

A mixture of 5 parts of vinyl butyl ether and 5 parts of 2-(β-phenylethyl)-4-penten-2-ol-3-one is heated on a steam bath in the presence of 0.3 part of benzoyl peroxide for a period of forty-five minutes to yield a clear, soft, elastic polymer slightly soluble in ethanol and toluene.

EXAMPLE 13

A mixture of 10 parts of 4,6-dimethyl-1-hepten-4-ol-3-one and 10 parts of 2-methyl-3-chloro-1,3-butadiene is dissolved in 80 parts of toluene containing 0.2 part of benzoyl peroxide. The resulting solution is heated on a steam bath for approximately three hours to give a solution of the polymer. On evaporation of the solvent a soft, tacky, plastic mass is obtained which can be drawn into long, fine filaments without breaking.

EXAMPLE 14

A mixture of 5 parts of methyl methylacrylate and 5 parts of 2-methyl-4-penten-2-ol-3-one is heated on a steam bath in the presence of 0.3 part of benzoyl peroxide for one-half hour to give a hard, clear polymer soluble in ethanol and toluene. An ethanol solution spread on a glass

EXAMPLE 15

A mixture of 10 parts of devinyl benzene and 10 parts of vinyl α-hydroxycyclohexyl ketone is heated on a steam bath in the presence of 0.3 part of benzoyl peroxide for approximately twenty minutes to yield a hard, brittle resin which is substantially insoluble in the common organic solvents. The degree of hardness and solubility of the polymer thus obtained may be controlled by the proportion of divinyl benzene employed.

EXAMPLE 16

A mixture of 5 parts of acrylonitrile and 5 parts of 2-methyl-4-penten-2-ol-3-one is heated on a steam bath for one-half hour in the presence of 0.2 part of benzoyl peroxide to give a tough, elastic, translucent polymer slightly soluble in ethanol. The polymer, when softened, can be drawn into very fine fibers. This fiber appears to have considerable tensile strength, good elasticity, and can be spun into thread.

EXAMPLE 17

A mixture of 5 parts of vinyl acetate and 5 parts of 2-methyl-4-penten-2-ol-3-one is heated on a steam bath for one-half hour in the presence of 0.2 part of benzoyl peroxide to give a soft, clear, elastic polymer soluble in alcohol and slightly soluble in toluene. On baking an ethanol solution of this polymer at 110° C. for a period of one hour a hard, clear, adherent abrasive resistant film is obtained. The soft polymer, as produced, on standing for a period of one month becomes quite hard.

EXAMPLE 18

A mixture of 10 parts of vinyl pyridine and 10 parts of 2-methyl-4-penten-2-ol-3-one is heated on a steam bath in the presence of 0.2 part of benzoyl peroxide for one-half hour to give a viscous, basic polymer. This product is dissolved in acetone and then precipitated by pouring the solution slowly into water to give a tacky, elastic, rubber-like polymer which is soluble in dilute sulfuric acid. The polymer can be reprecipitated from such solution by the addition of dilute sodium hydroxide.

EXAMPLE 19

A mixture of 10 parts of 2-methyl-4-penten-2-ol-3-one and 10 parts of styrene dissolved in 30 parts of toluene is heated on a steam bath in the presence of 0.2 part of benzoyl peroxide to give within one-half hour a viscous solution of a copolymer which is soluble in the hot reaction mixture but is precipitated in the cold. A portion of this solution when poured on to a glass plate and dried at 100° C. for one hour gives a hard, colorless, clear film which adheres firmly to glass. The product thus produced is soluble in ethanol and toluene.

EXAMPLE 20

A mixture of 10 parts of divinyl ether and 10 parts of 2-methyl-4-penten-2-ol-3-one is dissolved in 15 parts of ethanol and heated in a pressure bottle for eight hours at 70° C. in the presence of 0.2 part of benzoyl peroxide. A soft, tacky polymer, soluble in ethanol, is produced.

EXAMPLE 21

A mixture of 20 parts of 2-methyl-4-penten-2-ol-3-one and 20 parts of butadiene is polymerized in the presence of 0.4 part of benzoyl peroxide by heating in a pressure bottle for twelve hours at 60° C. A viscous product results which is dissolved in 95% ethanol and precipitated by pouring the solution into water. A rubbery, white, soft elastic polymer is obtained which is soluble in ethanol and slightly soluble in toluene and chloroform. The polymer thus produced exhibits good rebound and can be stretched into very long spider-web like elastic filaments. The product thus produced exhibits greater cohesion than adhesion.

EXAMPLE 22

A mixture of 20 parts of 2-methyl-4-penten-2-ol-3-one and 20 parts of butadiene is sealed in a pressure bottle together with 0.4 part of aluminum chloride. After three days standing at 25° to 30° C. a granular white polymer is formed. In addition, there is produced a low molecular weight, viscous, alcohol soluble oil which appears to possess good lubricating properties. The granular polymer thus obtained is washed with methanol to give a rubber-like, dry, granular composition insoluble in ethanol, toluene and butanol.

EXAMPLE 23

A mixture is made up as in Example 21, however, instead of carrying out the polymerization at 60° C., the mixture is allowed to stand for three days at 25° C. to 30° C. The polymer, unlike that formed in Example 21, is very similar to that obtained with the aluminum chloride catalyst in Example 22, being rubber-like and granular, indicating that the temperature employed in carrying out such a polymerization apparently has more influence on the molecular weight and rubber-like properties of the resulting polymer than the type of catalyst employed.

EXAMPLE 24

A mixture of 30 parts of 2-methyl-4-penten-2-ol-3-one and 20 parts of dicrotyl maleate is polymerized in the presence of 0.5 part of benzoyl peroxide by heating on the steam bath for three hours to give a tough, elastic translucent polymer. The product thus obtained is slightly soluble in ethanol.

It is to be strictly understood that the foregoing description and examples are for the purpose of illustration only, since it will be apparent to those skilled in the art that our invention is susceptible of numerous modifications without departing from the scope thereof. In general, it may be said that any polymeric compositions prepared by the homopolymerization of vinyl t-hydroxy ketones of the class described herein or by the conjoint or copolymerization of mixtures containing said vinyl t-hydroxy ketones and one or more polymerizable open chain compounds containing at least one —CH=C= group, are to be considered as lying within the scope of our invention.

What we claim is:

1. A copolymer comprising about 12.5–87.5% by weight of an open chain compound containing at least one —CH=C= grouping which is polymerizable at said grouping copolymerized with about 87.5–12.5% by weight of a ketone selected from the group consisting of ketones having the following general formula:

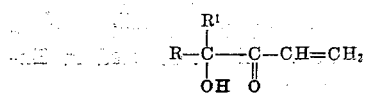

where R and R¹ are members of the group consisting of aralkyl, alkyl and aryl groupings, and ketones having the formula

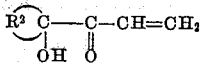

where R²C constitutes a cycloaliphatic ring.

2. A copolymer comprising about 12.5–87.5% by weight of an open chain compound containing at least one —CH=C= grouping which is polymerizable at said grouping copolymerized with about 87.5–12.5% by weight of 2-methyl-4-penten-2-ol-3-one.

3. A copolymer comprising about 12.5–87.5% by weight of styrene copolymerized with about 87.5–12.5% by weight of 2-methyl-4-penten-2-ol-3-one.

4. A copolymer comprising about 12.5–87.5% by weight of 2-methyl-3-chloro-1,3-butadiene copolymerized with about 87.5–12.5% by weight of 2-methyl-4-penten-2-ol-3-one.

5. A copolymer comprising about 12.5–87.5% by weight of an open chain compound containing a single —CH=C= grouping which is polymerizable at said grouping copolymerized with about 87.5–12.5% by weight of a ketone selected from the group consisting of ketones having the following general formula:

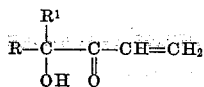

where R and R¹ are members of the group consisting of aralkyl, alkyl and aryl groupings, and ketones having the formula

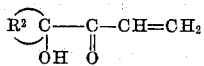

where R²C constitutes a cycloaliphatic ring.

6. A copolymer comprising about 12.5–87.5% by weight of an open chain compound containing two —CH=C= groupings which is polymerizable at said groupings copolymerized with about 87.5–12.5% by weight of a ketone selected from the group consisting of ketones having the following general formula:

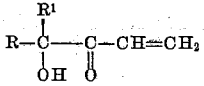

where R and R¹ are members of the group consisting of aralkyl, alkyl and aryl groupings, and ketones having the formula

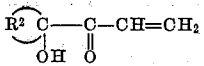

where R²C constitutes a cycloaliphatic ring.

7. A copolymer comprising not more than about 55% by weight of an open chain compound containing at least one —CH=C= grouping which is polymerizable at said grouping copolymerized with at least about 45% by weight of a ketone selected from the group consisting of ketones having the following general formula:

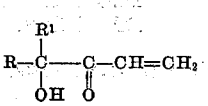

where R and R¹ are members of the group consisting of aralkyl, alkyl and aryl groupings, and ketones having the formula

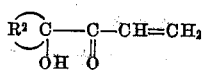

where R²C constitutes a cycloaliphatic ring.

8. A copolymer comprising not more than about 55% by weight of an open chain compound containing at least one —CH=C= grouping which is polymerizable at said grouping copolymerized with at least about 45% by weight of 2-methyl-4-penten-2-ol-3-one.

9. A copolymer comprising not more than about 55% by weight of two open chain compounds each containing a —CH=C= grouping which is polymerizable at said grouping copolymerized with at least 45% by weight of a ketone selected from the group consisting of ketones having the following general formula:

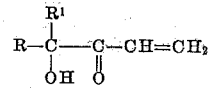

where R and R¹ are members of the group consisting of aralkyl, alkyl and aryl groupings, and ketones having the formula

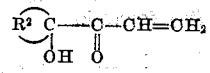

where R²C constitutes a cycloaliphatic ring.

10. A copolymer comprising not more than about 55% by weight of two open chain compounds each containing a —CH=C= grouping which is polymerizable at said grouping copolymerized with at least 45% by weight of 2-methyl-4-penten-2-ol-3-one.

11. A copolymer comprising not more than about 55% by weight of a mixture of styrene and vinyl butyl ether copolymerized with at least about 45% by weight of a ketone selected from the group consisting of ketones having the following general formula:

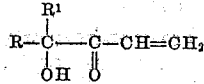

where R and R¹ are members of the group consisting of aralkyl, alkyl and aryl groupings, and ketones having the formula

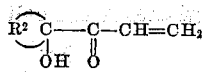

where R²C constitutes a cycloaliphatic ring.

12. A copolymer comprising not more than about 55% by weight of a mixture of styrene and vinyl butyl ether copolymerized with at least about 45% by weight of 2-methyl-4-penten-2-ol-3-one.

13. A copolymer comprising about 250 parts by weight of styrene and about 50 parts by weight of vinyl butyl ether copolymerized with about 250 parts by weight of 2-methyl-4-penten-2-ol-3-one.

14. A polymeric composition consisting essentially of a polymerized ketone selected from the group consisting of ketones having the following general formula:

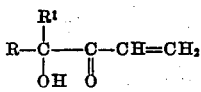

where R and R[1] are members of the group consisting of aralkyl, alkyl and aryl groupings, and ketones having the formula

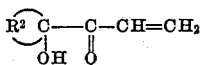

where $R^2 C$ constitutes a cycloaliphatic ring.

15. A polymeric composition consisting essentially of polymerized 2-methyl-4-penten-2-ol-3-one.

16. A process for forming a polymeric composition which comprises copolymerizing about 12.5–87.5% by weight of an open chain compound containing at least one —CH=C= grouping which is polymerizable at said grouping with about 87.5–12.5% by weight of a ketone selected from the group consisting of ketones having the following general formula:

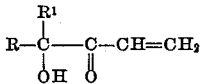

where R and R[1] are members of the group consisting of aralkyl, alkyl and aryl groupings, and ketones having the formula

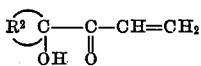

where $R^2 C$ constitutes a cycloaliphatic ring.

17. A process for forming a polymeric composition which comprises copolymerizing about 12.5–87.5% by weight of an open chain compound containing at least one —CH=C= grouping which is polymerizable at said grouping with about 87.5–12.5% by weight of a ketone selected from the group consisting of ketones having the following general formula:

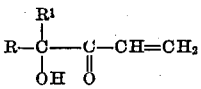

where R and R[1] are members of the group consisting of aralkyl, alkyl and aryl groupings, and ketones having the formula

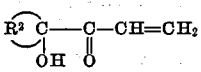

where $R^2 C$ constitutes a cycloaliphatic ring, in the presence of a hydrocarbon solvent.

18. A process for forming a polymeric composition which comprises copolymerizing approximately equal parts by weight of an open chain compound containing at least one —CH=C= grouping which is polymerizable at said grouping and a ketone selected from the group consisting of ketones having the following general formula:

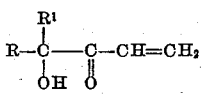

where R and R[1] are members of the group consisting of aralkyl, alkyl and aryl groupings, and ketones having the formula

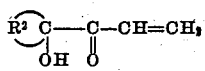

where $R^2 C$ constitutes a cycloaliphatic ring.

19. A process for forming a polymeric composition which comprises copolymerizing about 12.5–87.5% by weight of an open chain compound containing at least one —CH=C= grouping which is polymerizable at said grouping with about 87.5–12.5% by weight of 2-methyl-4-penten-2-ol-3-one.

20. A process for forming a polymeric composition which comprises copolymerizing not more than about 55% by weight of two open chain compounds each containing a —CH=C= grouping which is polymerizable at said grouping with at least 45% by weight of a ketone selected from the group consisting of ketones having the following general formula:

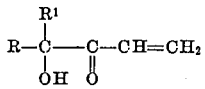

where R and R[1] are members of the group consisting of aralkyl, alkyl and aryl groupings, and ketones having the formula

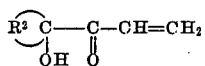

where $R^2 C$ constitutes a cycloaliphatic ring.

21. A process for forming a polymeric composition which comprises copolymerizing not more than about 55% by weight of two open chain compounds each containing a —CH=C= grouping which is polymerizable at said grouping with at least 45% by weight of 2-methyl-4-penten-2-ol-3-one.

22. A process for forming a polymeric composition which comprises copolymerizing not more than about 55% by weight of a mixture of styrene and vinyl butyl ether with at least about 45% by weight of a ketone selected from the group consisting of ketones having the following general formula:

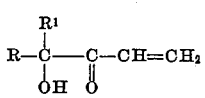

where R and R[1] are members of the group consisting of aralkyl, alkyl and aryl groupings, and ketones having the formula

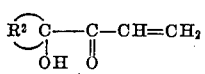

where $R^2 C$ constitutes a cycloaliphatic ring.

23. A process for forming a polymeric composition which comprises copolymerizing not more than about 55% by weight of a mixture of styrene and vinyl butyl ether with at least about 45% by weight of 2-methyl-4-penten-2-ol-3-one.

24. A process for forming a polymeric composition which comprises copolymerizing about 250 parts by weight of styrene, about 50 parts by weight of vinyl butyl ether and about 250 parts by weight of 2-methyl-4-penten-2-ol-3-one.

RICHARD S. WILDER.
DANIEL F. HERMAN.

No references cited.